US008561782B2

(12) United States Patent
McCarry et al.

(10) Patent No.: US 8,561,782 B2
(45) Date of Patent: Oct. 22, 2013

(54) HELICAL CONVEYOR APPARATUS WITH INTEGRATED PASS-THROUGH

(75) Inventors: Robert A. McCarry, Neenah, WI (US); Keith Fiebig, Oshkosh, WI (US); Nathan Grams, Oshkosh, WI (US); Dan Dillinger, Oconto, WI (US)

(73) Assignee: Pack Air Inc., Neenah, WI (US)

( * ) Notice: Subject to any disclaimer, the term of this patent is extended or adjusted under 35 U.S.C. 154(b) by 175 days.

(21) Appl. No.: 13/149,162

(22) Filed: May 31, 2011

(65) Prior Publication Data

US 2012/0305365 A1      Dec. 6, 2012

(51) Int. Cl.
*B65G 47/252* (2006.01)

(52) U.S. Cl.
USPC ............. 198/417; 198/861.5; 198/369.3

(58) Field of Classification Search
USPC .......... 198/860.1, 861.1, 861.4, 861.5, 369.2, 198/369.3, 416, 417
See application file for complete search history.

(56) References Cited

U.S. PATENT DOCUMENTS

| | | | | | |
|---|---|---|---|---|---|
| 2,692,713 | A | * | 10/1954 | Silva | 53/392 |
| 3,722,657 | A | * | 3/1973 | Kienle et al. | 198/394 |
| 5,515,796 | A | * | 5/1996 | Ogle et al. | 112/2.1 |
| 5,692,593 | A | * | 12/1997 | Ueno et al. | 198/369.2 |
| 5,823,317 | A | * | 10/1998 | Bankuty et al. | 198/395 |
| 5,909,796 | A | * | 6/1999 | Soldavini | 198/369.2 |
| 6,105,751 | A | * | 8/2000 | Jentjens et al. | 198/435 |
| 6,142,287 | A | * | 11/2000 | Biffert et al. | 198/404 |
| 7,147,098 | B2 | * | 12/2006 | Ledingham | 198/453 |
| 7,617,921 | B2 | * | 11/2009 | Workman et al. | 193/46 |

* cited by examiner

*Primary Examiner* — Patrick Mackey
(74) *Attorney, Agent, or Firm* — Boyle Fredrickson, S.C.

(57) ABSTRACT

A material handling system has a helical conveyor apparatus operable in a first mode in which the orientation of a product can be changed and a second mode in which the orientation of the product is unchanged, i.e., passed through. The helical conveyor apparatus has a pair of conveying surfaces, with at least one of the conveying surfaces pivotal relative to the other conveying surface. The conveying surfaces can thus be arranged to twist the product as it is being conveyed or pass the product unaltered.

22 Claims, 16 Drawing Sheets

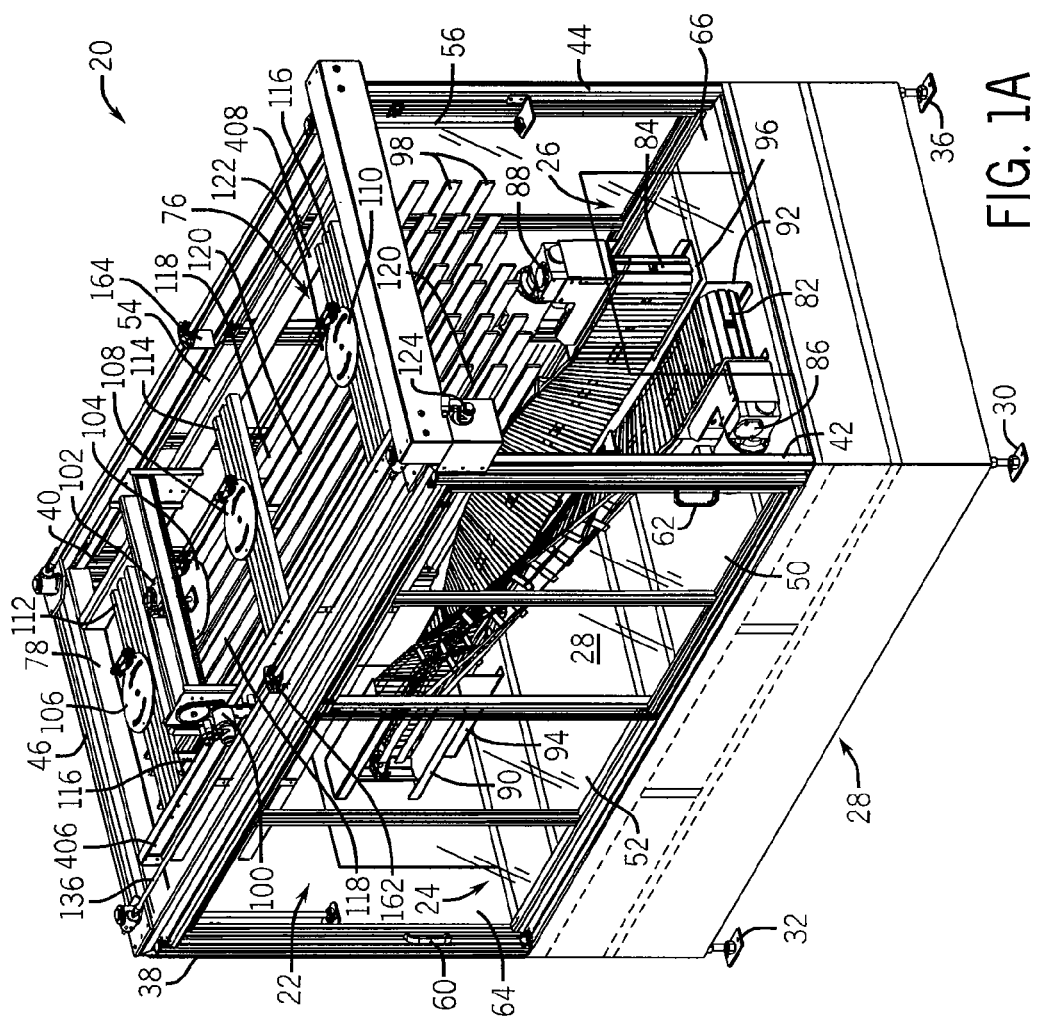

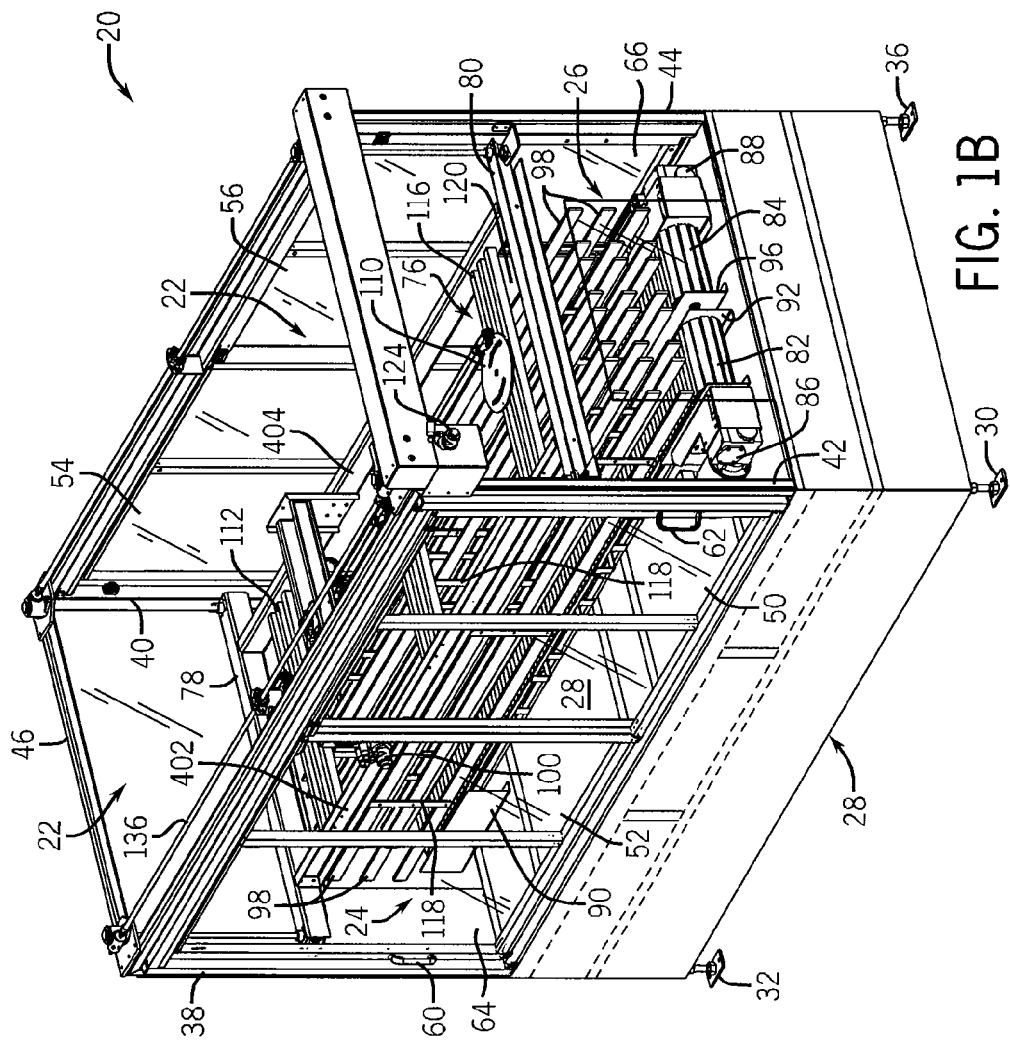

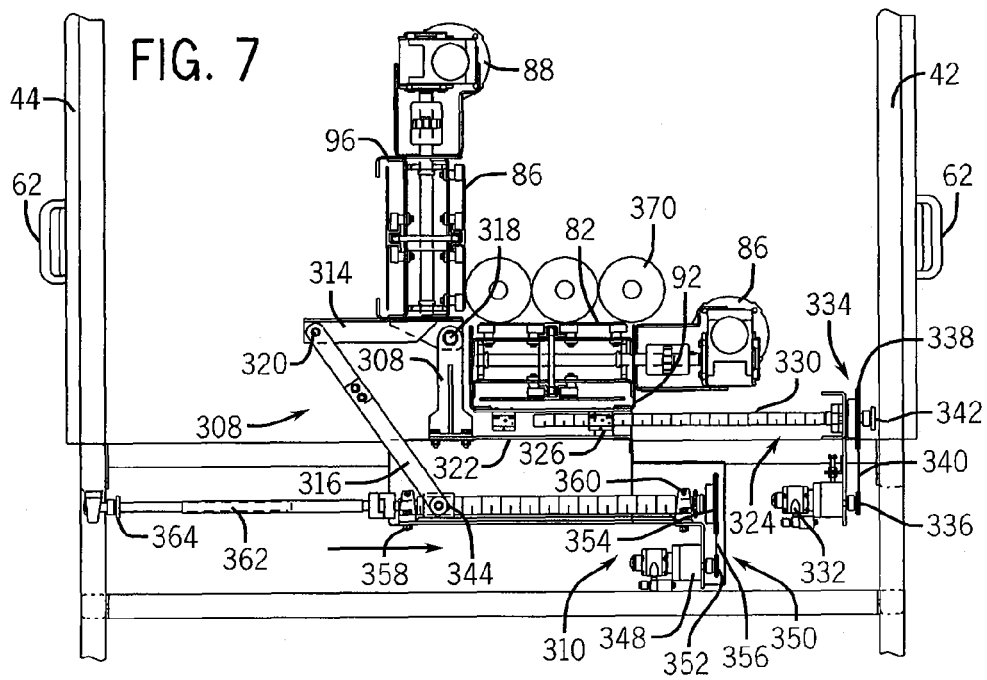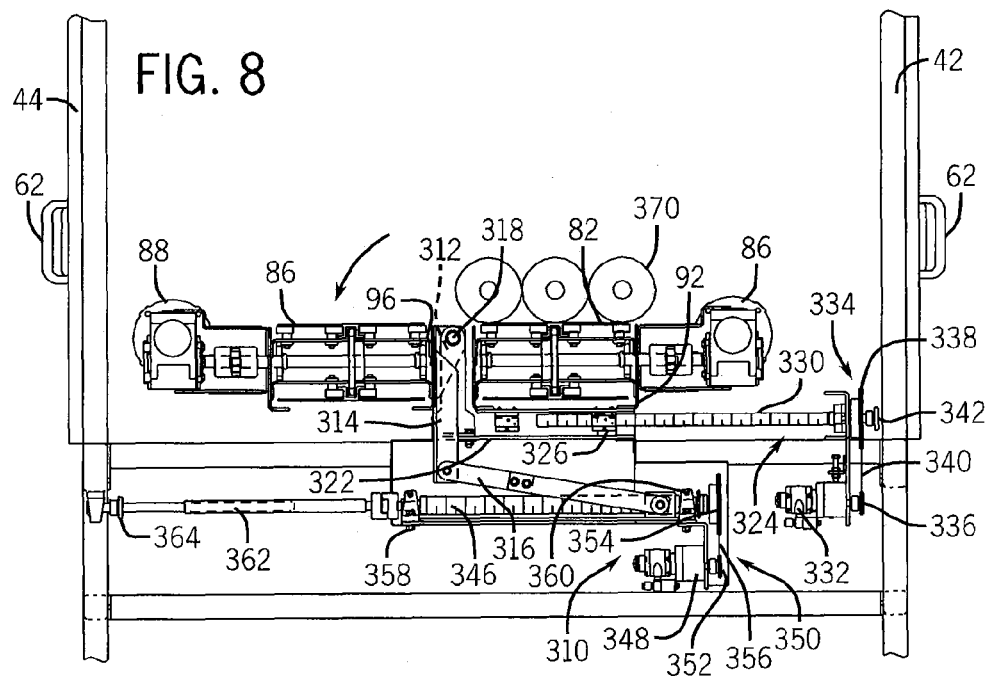

HELICAL CONVEYOR APPARATUS WITH INTEGRATED PASS-THROUGH

BACKGROUND OF THE INVENTION

The present invention relates generally to conveying systems and, more particularly, to a conveyor system that changes the orientation of a product or array of products as they are being conveyed.

For many material handling systems, a product, or array of products, it is desirable to change the orientation of the product before it is fed to a downstream stage of the material handling system, such as a wrapper, case packer, bundler, palletizer, or other product "warehouser". For instance, for many paper roll handling systems, the paper rolls are conventionally conveyed on their side (lay-flat orientation) but are packaged in an upright position. To change the orientation of the paper rolls, the paper roll handling system will include an upending stage that is designed to upend the paper rolls.

Conventional upending handling systems have taken many forms as designers made efforts to improve throughput as well as consistency in changing the orientation of the products.

Early efforts at designing upending handling systems involved the use of twisted guide rails or gravity drops from one handling stage ("conveyor") to another. These early systems were found to be unreliable and typically had one set of rails for each product to be handled. As a result, component changes were required each time a new type or size of product was to be conveyed.

A second type of upending device incorporated a powered conveyor with a side mounted belt conveyor. The belt conveyor was height, speed, and angle adjustable and it required adjusting the side belt for each product that ran through it but was much more flexible than previous designs and could be adjusted to run several different products. It could, with the correct guide rail adjustment, allow products to pass through without being upended. One of the drawbacks of this type of upending device was that it was very difficult to carry out fine tune adjustments and could require several adjustment setting changes during a run dependant on package density (e.g., firmness of the roll wind) or conveying surface (e.g., poly) changes that effect the slip of the conveying surface on the chain/belt arrangements or could even require adjustments based on either looseness of the conveyed product or the dust build up on the equipment during a shift run. This type of upending device would typically be built with either a clockwise or counterclockwise rotation and could even be supplied with two belts to allow upending in either direction. However, such systems did not allow product to back up on the upending belt without risking damage to the product.

A third type of upending device also incorporated a powered conveyor with a side mounted belt conveyor. This design however allowed the belt to be switched from either the left or right side of the device to allow packages passing through to be upended either clockwise or counterclockwise with the use of only one belt. This design was less costly and more customer friendly as there was no equipment off the side of the conveyor when not in use and it allowed the customer to change package orientations at a later date without adding more equipment. However, this design still required that the belt conveyor height, speed and angle be adjustable and it required adjusting the side belt for each product that ran through it but was much more flexible and could be adjusted to run several different products. It could also with the correct guide rail adjustment allow packages to pass through without being upended. This was still a very difficult fine tune adjustment and could require several adjustment setting changes during a run dependant on package density (firmness of the roll wind) or conveying surface changes that effect the slip of the conveying surface on the chain/belt arrangement or could even require adjustments based on either looseness of the conveyed product or the dust build up on the equipment during a run. Similar to previous designs, this design was susceptible to product damage if product was allowed to back up on the upending belt.

Another type of upending device incorporated a side gripper elevator that would pick up product from the side and as it traveled through the gripper. The side in which the product was handled would be changed and upend the product during the elevation change. This style of gripper upender was very positive and allowed for an easy hand crank adjustment between products. This device required that product change elevation during the upending process. Another drawback of this type of device was that it could not be switched between an upending device and a non-upending device. As a result, a bypass system had to be added that allowed the upending device to be bypassed when upending of a device was not desired.

Another type of upending device was developed by Pack Air Inc. of Neenah, Wis. and it used two conveying surfaces to effectively "twist" the product as the product was being conveyed from an infeed end to a discharge end. The helical upending device would positively upend the product and would not require any operator changes when either product sizes changed or when density or conveyor surface changes were made. These devices were very positive and did not require speed or rail adjustments to run different products. However, a drawback of this early helical upender was that the conveying surfaces were quite long, and it required spring take ups for the chain. Moreover, a bypass line was required if products did not require upending.

In effort to address the drawbacks of these early helical upenders, Pack Air Inc. then developed a much shorter helical upending device. For example, this second generation of the helical upending device was approximate ten feet or half the length of the early helical upender. This helical upending device also incorporated an air take up device. The upender could be setup for either clockwise or counterclockwise rotation but not both. While this helical upending device provided very positive conveyance and also did not require adjustments between product changes, the device was limited to fixed side upending and required a bypass to allow product that did not require orientation changes or the product would have to be reoriented after being discharged.

A number of design efforts have been made to effectively and efficiently provide bypass of the helical upender for those products that do not require reorientation. Such efforts have included diverting the products off line and going around the device, putting the device on slides and interchanging the device with a conveyor that provides pass-through, or reorienting the product after it passes through the device. While generally effective in providing product bypass, these bypassing systems enlarge the footprint of the material handling system as well as increase system acquisition and maintenance costs.

SUMMARY OF THE INVENTION

The present invention provides a material handling system operable in a first mode in which the orientation of a product, or an array of products, is changed or in a second mode in which the product(s) are simply passed through without an orientation change. The material handling system can be used as either an upending or downending device, or it can be transformed into a flat conveyor allowing products to pass straight through without changing the product orientation, thereby avoiding the need for a separate bypass device.

It will thus be appreciated that the inventive handling system will offer benefits similar to that of a fixed helical upending unit; namely, product will remain in contact with at least two conveying surfaces as the product is being conveyed and reoriented. Product will be able accumulate through the system during a run thereby allowing the system to be located along any location of the conveyor line including inside of packaging equipment itself.

The material handling system will also be usable as a straight through ("pass-through") conveyor with single lane to multiple lanes of product being conveyed. In the upending mode, the conveying surfaces can be arranged to provide clockwise rotation or counterclockwise rotation of the product.

The conveying surfaces may be independently driven to translate at the same or different speeds. When arranged to lay flat, driving the conveying surfaces at two different speeds further allows turning of product as it conveyed from the infeed end to the discharge end of the material handling system.

Therefore, in accordance with one aspect of the invention, a conveying apparatus includes a first conveying surface and a second conveying surface adjacent the first conveying surface. The second conveying surface is pivotable between a raised position in which the second conveying surface is operative to cooperate with the first conveying surface to rotate an object from a first position to a second rotated position as the object travels along the first conveying surface and a lowered position in which the second conveying surface is substantially coplanar with the first conveying surface for passing of an object without rotation.

In accordance with another aspect of the invention, a conveying apparatus has first and second conveying surfaces for positively translating a package from an infeed end to a discharge end. The apparatus further includes a first operating arrangement in which the first and the second conveying surfaces cooperate to twist a package as it translates along the first and second surfaces, and a second operating arrangement in which the first and second conveying surfaces cooperate to pass a package without twisting.

According to another aspect of the invention, a conveying apparatus includes an infeed end and a discharge end. A pair of elongated conveying surfaces extends between the infeed end and the discharge end. The conveying surfaces are operable in a first orientation in which the conveying surfaces provide positive contact with two orthogonal sides of an object as the object is conveyed from the infeed end to the discharge end and operable in a second orientation in which the conveying surfaces provide positive contact with only one side of the object as the object is conveyed from the infeed end to the discharge end.

Various other features, objects, and advantages of the present invention will be made apparent from the followed detailed description and the drawings.

BRIEF DESCRIPTION OF THE FIGURES

Preferred exemplary embodiments of the invention are illustrated in the accompanying drawings in which like reference numerals represent like parts throughout.

In the drawings:

FIG. 1A is an isometric view of a helical conveyor apparatus according to the present invention with the conveyor apparatus arranged to upend a package;

FIG. 1B is an isometric view of the helical conveyor apparatus of FIG. 1A arranged to pass through a package without a change in orientation of the package;

FIG. 7 is a simplified view of the infeed end of the helical conveyor apparatus as shown in FIG. 1A;

FIG. 8 is a simplified view of the infeed end of the helical conveyor apparatus as shown in FIG. 1B;

DETAILED DESCRIPTION OF THE INVENTION

Figure 2:
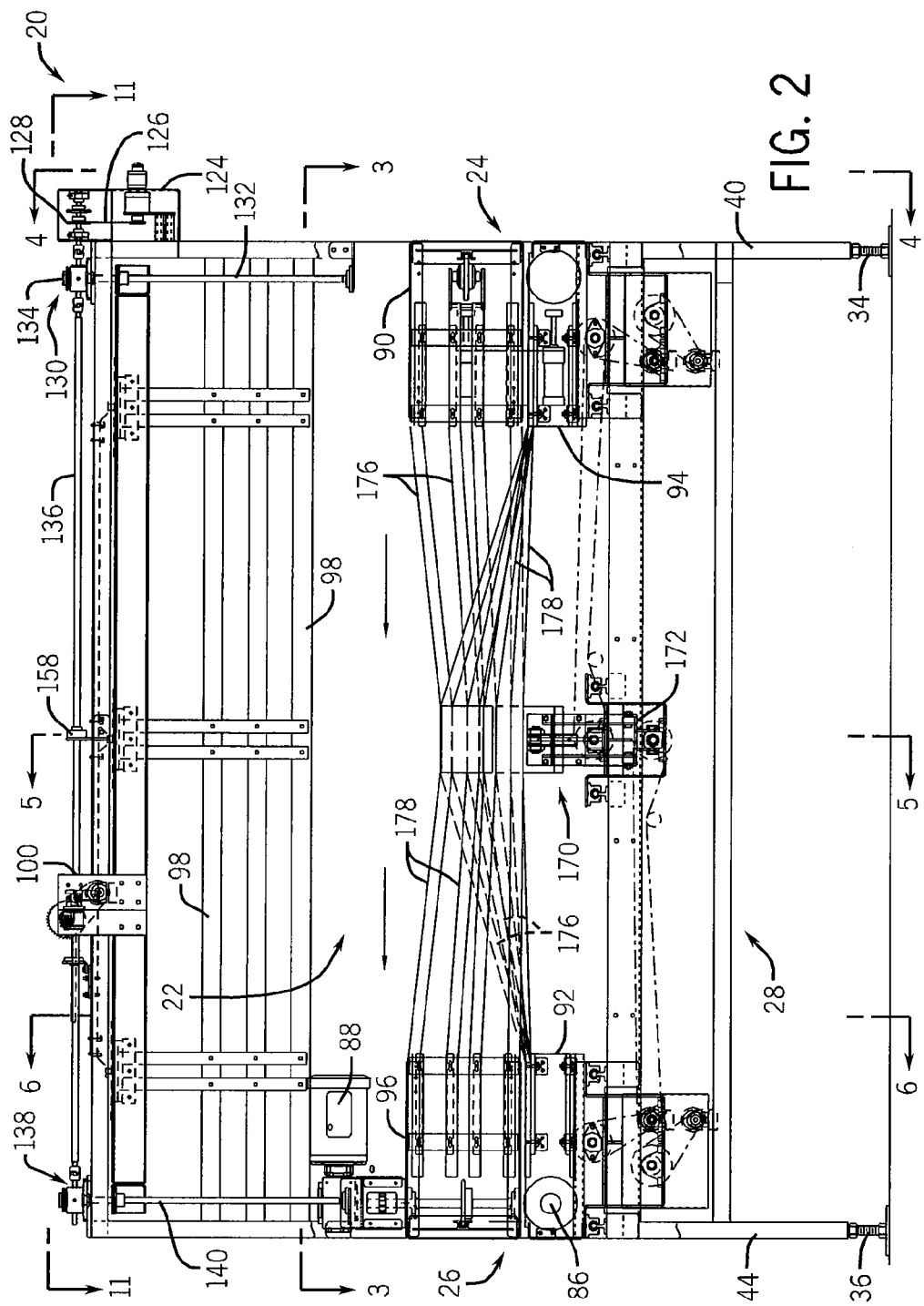
FIG. 2 is a section view of the helical conveyor apparatus taken along line 2-2 of FIG. 1A.

The present invention will be described with respect to a material handling system for conveying rolls of towel material. It should be appreciated however that the invention could be used to convey other types of products, objects, and packages.

Turning now to FIGS. 1A and 1B, a material handling system 20 according to one embodiment of the invention includes a helical conveyor apparatus 22 operable in an upending mode, as shown in FIG. 1A, or a pass-through mode, which is shown in FIG. 1B. While an upending helical conveyor apparatus 22 is shown, it will be appreciated that the invention could be also be used with a downending helical conveyor apparatus. As will be described herein, the helical conveyor apparatus 22 is switchably operable in either the upending mode, in which the helical conveyor apparatus 22 is operable to reorient an object as it is conveyed from infeed end 24 to a discharge end 26, or in the pass-through mode in which the objects are simply conveyed to the discharge end 26. Thus, the present invention provides a material handling system 20 capable of conveying objects sans reorientation without diverting the objects to a bypass assembly. The helical conveyor apparatus 22 may be used to convey objects to a number of different assemblies of a comprehensive material handling system, e.g., wrapper, case packer, bundler, palletizer, and the like.

The material handling system 20 has a generally rectangular base 28 that is raised slightly above a floor by feet 30, 32, 34, 36. Extending uprightly from the base is a pair of infeed end posts 38, 40 and a pair of discharge end posts 42, 44. Upper crossbar 46 connects the upper ends of posts 38, 40 and upper crossbar 48 connects the upper ends of posts 42, 44. Windows 50, 52, 54, 56, which are preferably formed of shatterproof material extend between the infeed end and discharge end posts, and together with the base 28 define an enclosure 58 for the helical conveyor apparatus 22. As known in the art, the windows have handles 60, 62 that when grasped make sliding the windows between open and closed positions more convenient. When the windows are closed, the helical conveyor apparatus 22 cannot be accessed. As known in the art, a safety switch (not shown) may be associated with the windows such that opening of a window automatically causes operation of the helical conveyor apparatus 22 to stop. The discharge end 26 and the infeed end 24 each have protective windows 64, 66. Further, the base 28 includes panels 68, 70, 72, 74 that form an enclosure for various support structure (not shown) and mechanicals (not shown) of the helical conveyor apparatus 22.

The material handling system 20 includes an automated guide rail assembly 76 that is mounted between a pair of guide booms 78, 80 that are configured to move between a raised and lowered position so as to raise and lower the guide rail assembly 76, as will be described more fully below. It will be appreciated that the illustrated guide rail assembly 76 is merely exemplary and that other types of guide rail assemblies may also be used.

The helical conveyor apparatus 22 has first and second conveying surfaces 82, 84 designed to pass objects from the infeed end 24 to the discharge end 26. The conveying surfaces 82, 84 can be of any known type including, but not limited to table-top, mat-top, slat chain, etc. Additionally, the conveying surfaces can be formed of any known material, e.g., plastic, metal, ceramic, etc. Conveying surface 82 is entrained about a drive roller (not shown) and a driven roller (not shown). The drive roller is operatively connected to a drive motor 86 that is operative to rotate the drive roller and thus translate the conveying surface 82, as known in the art. In a similar manner, conveying surface 84 is entrained about a drive roller and a driven roller (neither shown), with the drive roller operatively coupled to a drive motor 88. It is contemplated that the motors could be independently driven or arranged in a master-slave arrangement. Any known type of motor control(s) can be used to control operation of the motors 86, 88 and thus the speed at which the conveying surfaces 82, 84 translate. In many applications, the motors 86, 88 are driven so that the conveying surfaces 82, 84 translate at substantially the same speed. However, the conveying surfaces 82, 84 can be caused to translate at different speeds so as to turn an object as it is translated from the infeed end 24 to the discharge end 26. While the invention is not so limited, in one embodiment, the distance between the infeed end 24 and the discharge end 26 is approximately ten feet.

The infeed end 24 of conveying surface 82 is supported by an infeed carriage 90 and the discharge end 26 of the conveying surface 82 is supported by a discharge carriage 92. These carriages 90, 92 effectively form mounting or framing structures to which the infeed and discharge end rollers are attached. In addition to serving as a mounting point for the roller, it will be appreciated that carriages 90, 92 support conveying surface 82 in a raised, position above the base 28. Drive motor 86 is mounted to the discharge carriage 92.

The infeed end 24 of conveying surface 84 is also supported by an infeed carriage 94 and the discharge end 26 of the conveying surface 84 is supported by a discharge carriage 96. These carriages 94, 96 effectively form mounting structures to which the infeed and discharge end rollers are attached. In addition to serving as a mounting point for the roller, it will be appreciated that carriages 94, 96 support the conveying surface 84 above the base 28. Drive motor 88 is mounted to carriage 96.

Figure 4:
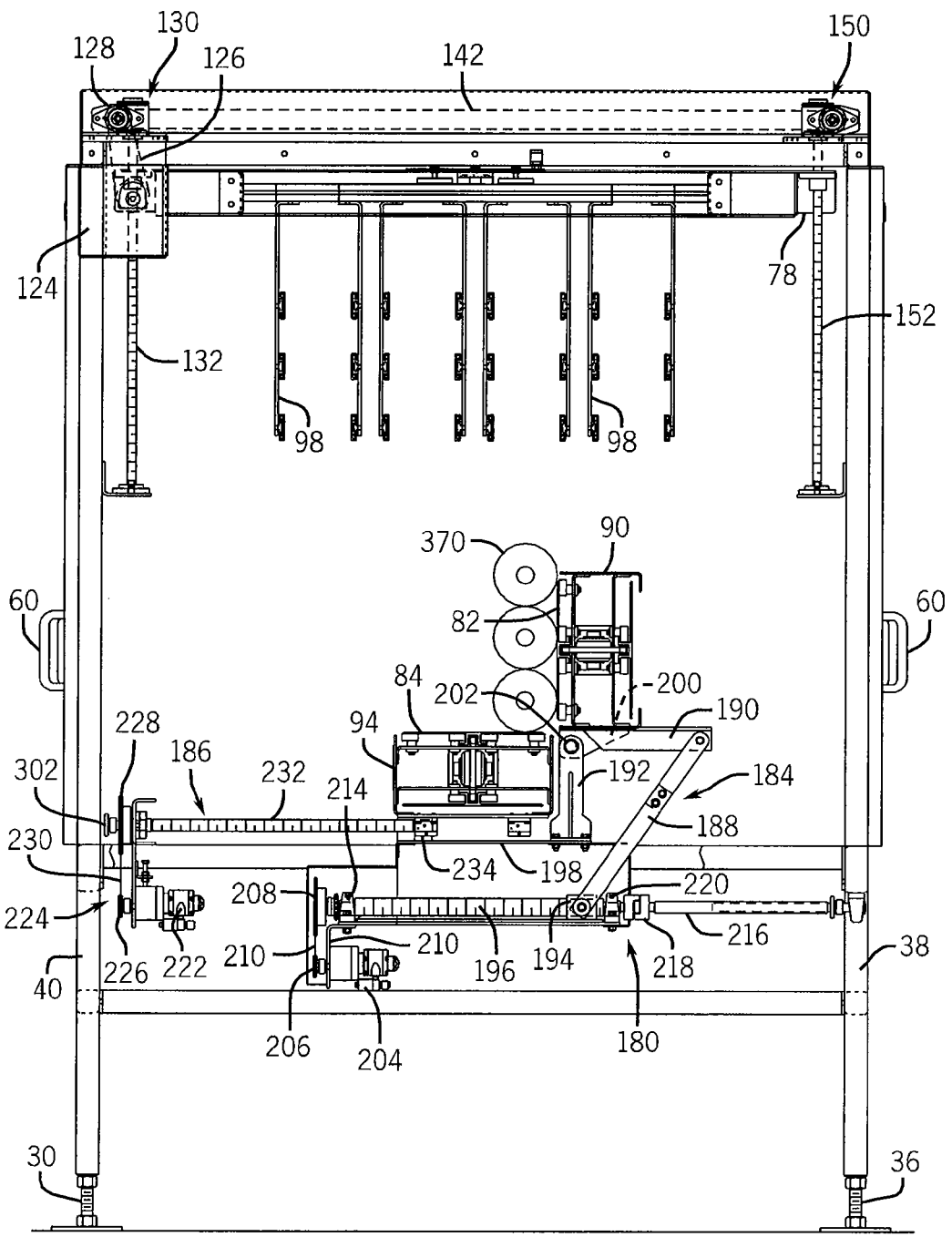
FIG. 4 is a section view of the helical conveyor apparatus taken along line 4-4 of FIG. 2.
Figure 9:
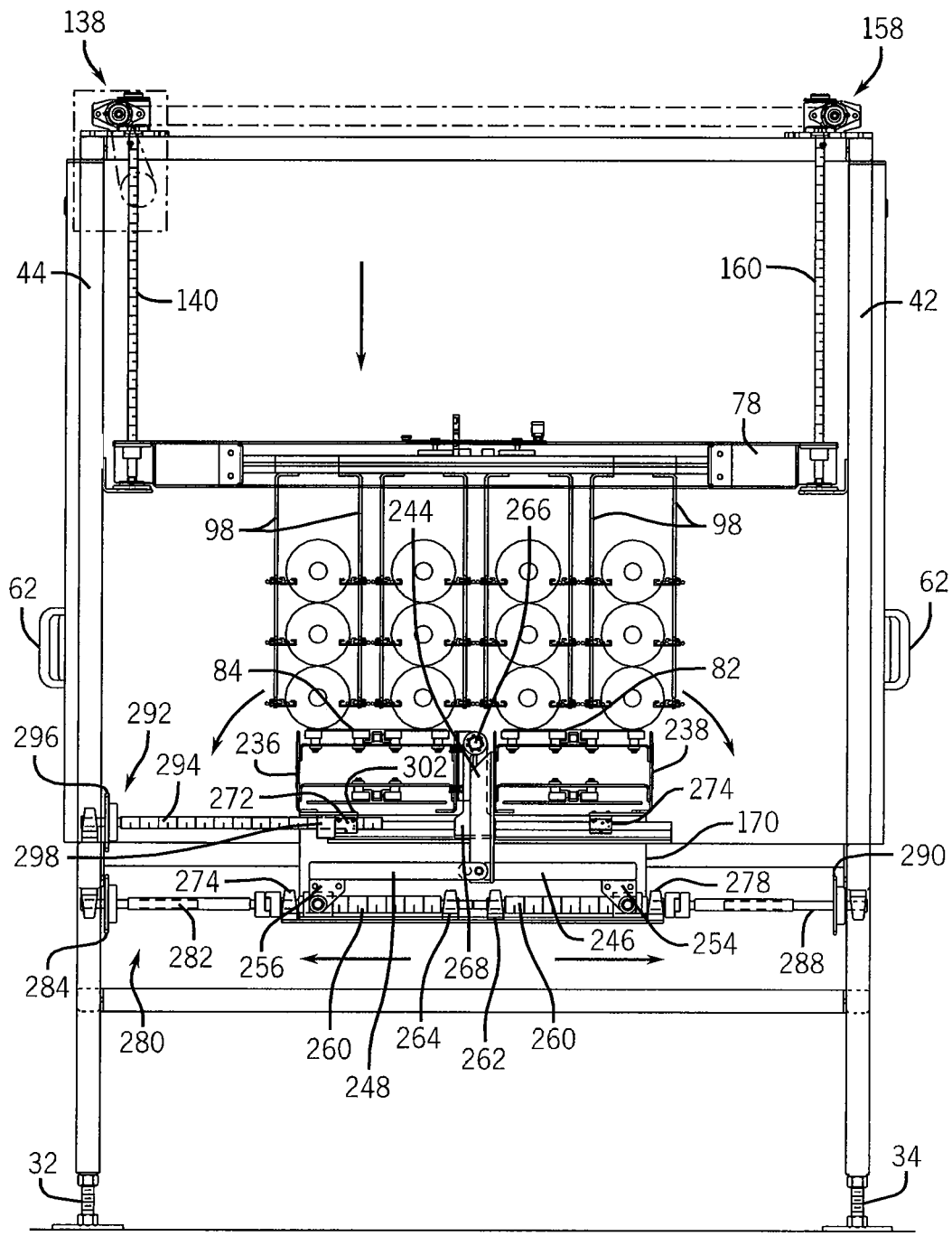
FIG. 9 is a simplified view of the infeed end of the helical conveyor apparatus in the pass-through orientation of FIG. 1B shown passing an array of paper rolls according to one aspect of the invention.

With additional reference to FIGS. 2, 4, and 9, the guide rail assembly 76 is movable between a raised position (FIG. 1A) and a lowered position (FIG. 1B). The guide rail assembly 76 controls the relative spacing between rails 98 that extend lengthwise parallel to the conveying direction. Spacing between the rails 98 is controlled by a motor 100 and gearbox 102. The gearbox 102 is mechanically coupled to a master cam plate 104, which is connected to slave cam plates 106, 108, 110. As the cam plates are rotated, either directly or indirectly, the spacing between the rails 98 is varied. When the helical conveyor apparatus 22 is being used to rearrange an object, the rails 98 are in the raised position as shown in FIG. 1A. However, when the helical conveyor apparatus 22 is being used for pass through of an array of objects, the rails 98 may lowered, as shown in FIG. 1B. The use of the rails is use-dependent and may not always be used, even when the helical conveyor apparatus 22 is in the pass-through configuration. Additionally, it is contemplated that the material handling system 20 may have a different type of guide system than that disclosed herein.

The guide rail assembly 76 includes the aforementioned rails 98, which are connected to the cam plates 106, 108, and 110 by headers 112, 114, 116, respectively. Extending downward from the headers are mounting flanges 118, 120, 122 to which the rails 98 are attached. The rails 98 are stacked vertically so that the rails collectively have a height that allows the guide rail assembly 76 to be used with objects of varying height.

The guide rail assembly 76 is movable between a raised and lowered position by drive motor 124, which, as shown in FIG. 4, drives a belt 126 entrained about a pulley 128. In the arrangement shown in FIGS. 1A and 1B, the drive motor 124 is at the discharge end 26 of the helical conveyor apparatus 22. It is possible, as shown in FIGS. 2 and 4, for the drive motor 124 to be at the infeed end 24 of the helical conveyor apparatus 22. For purposes of describing raising and lowering of the guide rail assembly 76, reference will be made to an infeed end placement of the drive motor 124.

In a preferred embodiment, the drive motor 124 is a reversible motor which allows the belt 126 to be rotated in either a clockwise direction or a counterclockwise direction. The pulley 128 is coupled to a screw drive 130 that is in turn connected to a helical shaft 132 such that operation of the motor 124 in a forward direction causes the screw drive 120 to rotate the helical shaft 132 in a first rotational direction. This results in the guide boom 78 being moved from the raised position shown in FIG. 4 to the lowered position shown in FIG. 9. On the other hand, when the motor 120 is driven in reverse, the screw drive 130 reverses rotation of the helical shaft 132 to raise the guide boom 78 and thus the rails 98.

Screw drive 130 has a transfer case 134 that allows the screw drive 130 to drive rotation of helical shaft 132 in response to rotation of the pulley 128. In addition, the transfer case 134 is connected to rod 136 that extends rearwardly to screw drive 138 which is operative to rotate helical shaft 140.

Figure 11:
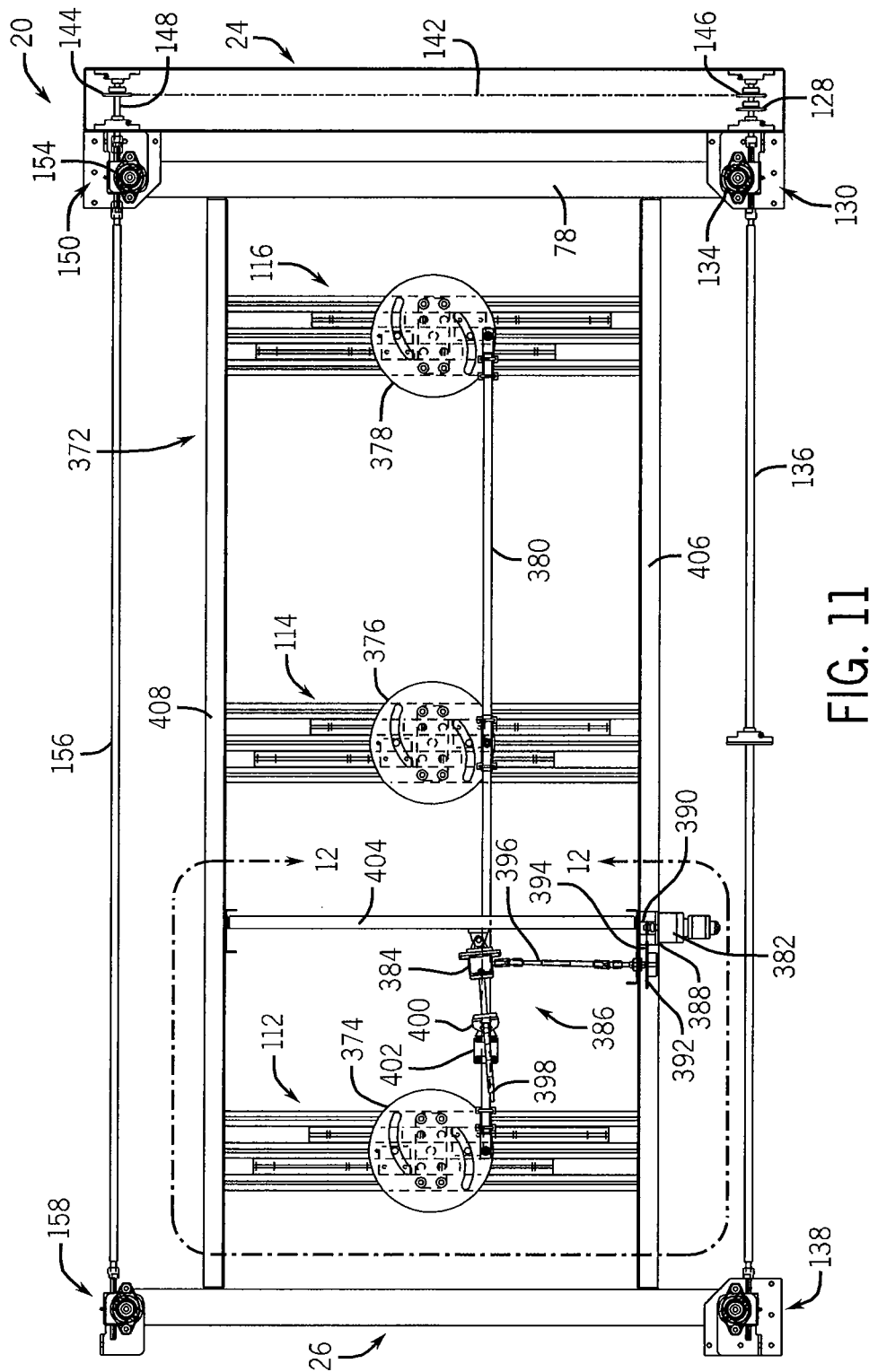
FIG. 11 is a top plan view of the guide rail assembly of the helical conveyor apparatus according to another aspect of the invention.

In addition to causing rotation of belt 126, pulley 128, when driven by drive motor 124, causes rotation of a belt 142, which is entrained about pulley 144 and a pulley 146 mechanically coupled to a drive shaft 148, as best shown in FIG. 11. This pulley 146 is rotatably engaged with screw drive 150, which drives rotation of helical shaft 152. As the helical shaft 152 is rotated, the guide boom 78 is raised or lowered.

Figure 6:
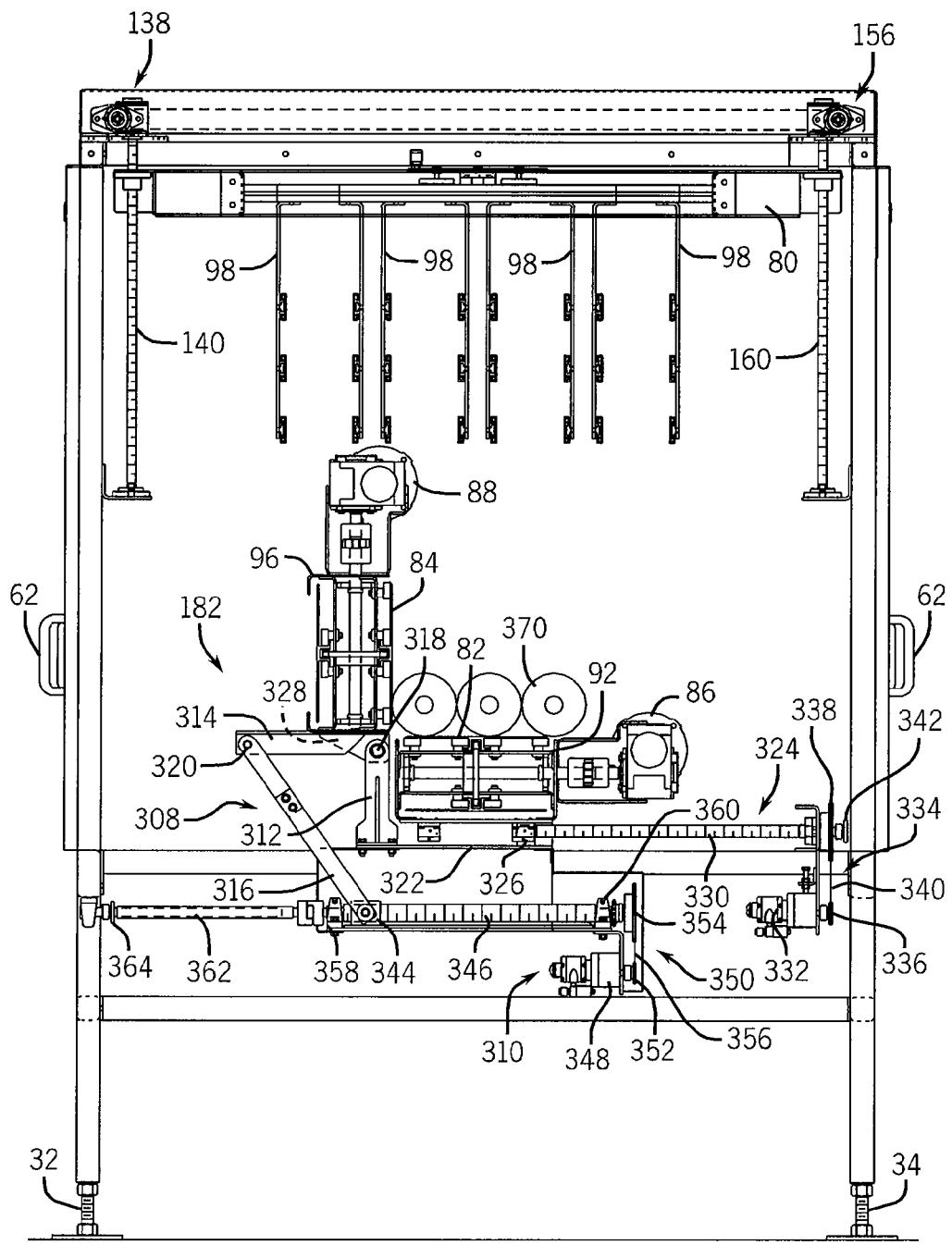
FIG. 6 is a section view of the helical conveyor apparatus taken along line 6-6 of FIG. 2.

Screw drive 150 has a transfer case 154 with an output connected to rod 156. The opposite end of rod 156 is connected to screw drive 158, which drives rotation of helical shaft 160, as best shown in FIG. 6. Rotation of helical shafts 140 and 160 raises and lowers guide boom 78. It thus be appreciated that a single drive motor together with a series of screw drives are operative to raise and lower the guide booms 78, 80 and, thus, raise and lower the guide rail assembly 76. It will be appreciated however that other types of arrangements could be used to raise and lower the guide rail assembly.

Referring briefly again to FIGS. 1A and 1B, in a preferred embodiment, brackets 162, 164 are mounted to elongated frame members 166, 168, respectively. The elongated frame members 166, 168 extend fore and aft between crossbars 46, 48 in spaced parallel relationship with one another. The brackets 162, 164 provide support for rods 136, 156 as they span the length of the helical conveyor apparatus 22.

Referring briefly again to FIG. 2, helical conveyor apparatus 22 further includes a mid-length support structure 170 that supports the conveying surfaces 82, 84 between the infeed end 24 and the discharge end 26. As will be described more fully below, the mid-length support structure 170 is mounted to a carriage 172 that is moved laterally by a center tipping assembly 174 when the helical conveyor apparatus 22 is switched between the upending and pass-through modes.

Figure 3:
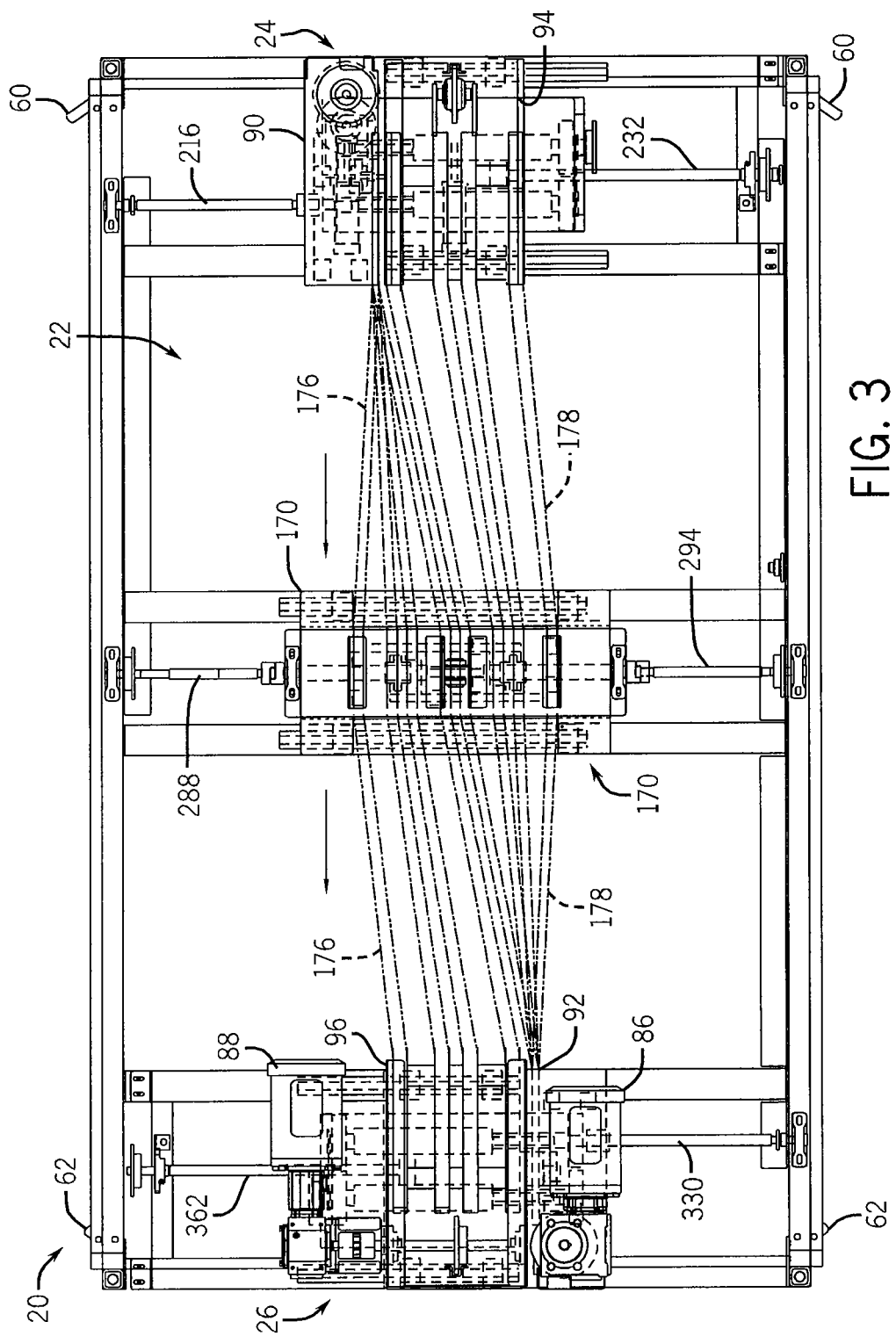
FIG. 3 is a top view of the helical conveyor apparatus taken along line 3-3 of FIG. 2.

As also shown in FIG. 2, as well as FIG. 3, the conveying surfaces 82, 84 are supported by respective wear strips 176, 178. As known in the art, the wear strips 176, 178 are made from flexible material, which allows the conveying surfaces 82, 84 to be twisted.

As noted above, the present invention provides a material handling system 20 in which the helical conveyor apparatus 22 is usable in either an upending mode or a pass-through mode. In the upending mode, which is shown in FIGS. 1A and 2-7, the conveying surfaces 82, 84 are effectively twisted ninety degrees between the infeed end 24 and the discharge end 26. This twisting of the conveying surfaces 82, 84 is by an infeed tipping assembly 180, center tipping assembly 174, and a discharge tipping assembly 182. As will be described more fully below, the infeed tipping assembly 180 moves the conveying surfaces at the infeed end 24 laterally and lowers conveying surface 82 to a lay-flat position when the helical conveyor apparatus 22 is moved to the pass-through position. Similarly, the discharge tipping assembly 182 moves the conveying surfaces at the discharge end 26 laterally and lowers conveying surface 84 to a lay-flat position when the helical conveyor apparatus 22 is moved to the pass-through position. The infeed tipping assembly 180 and the discharge tipping assembly 182 also drive respective portions of the center tipping assembly 174 to untwist/twist the conveying surfaces at the center of the helical conveyor apparatus 22 when it is moved between the upending and pass-through positions.

Turning now to FIG. 4, the infeed end 24 of the helical conveyor apparatus 22 is shown in the upending position. Accordingly, conveying surface 82 is an upright position, e.g., ninety degrees, and conveying surface 84 is in a lay-flat or horizontal position. The conveying surface 82 is supported by infeed carriage 90 mounted to a linkage 184 that is operable to move the infeed carriage 90, and thus conveying surface 82, between the upright and lay-flat positions. Infeed carriage 94 is always in the lay-flat position, but is connected to a lateral screw drive 186 to move the infeed carriage 94 laterally, as will be described more fully below.

The linkage 184 is a three-arm linkage consisting of an inner arm 188, a center arm 190, and an outer arm 192. The inner arm 188 has a first end pivotally coupled to a follower 194 that is in threaded engagement with drive shaft 196. The opposite second end of the inner arm 188 is pivotally coupled to the center arm 190. The other end of the center arm 190 is pivotally coupled to outer arm 192. The opposite end of the center arm 190 is fixedly attached to a carrier 198. The infeed carriage 90 is fixedly mounted to a gusset 200 that is pivotally coupled to the outer arm 192 and, as will be described, enables the infeed carriage 90 to pivot about pivot pin 202.

Drive shaft 196 is a screw-type drive shaft and is operably coupled to drive motor 204 by a drive pulley 206. The drive motor 204 is a bidirectional motor and thus can cause the drive pulley to rotate in forward and reverse directions. The drive pulley 206 is mechanically linked to a driven pulley 208 by a belt 210. The drive shaft 196 is coupled to the driven pulley 208 such that rotation of the driven pulley 208 in a forward direction causes the drive shaft 196 to rotate in a first direction, e.g., clockwise direction. Rotation of the drive motor 204 in the opposite direction causes the drive shaft 196 to likewise rotate in the opposite direction, e.g., counterclockwise direction. The follower 194 is threadingly engaged with the drive shaft 196 and, as such, as the drive shaft 196 rotates, the follower 194 either moves toward driven pulley 208 or away from driven pulley 208. The drive motor 204 is attached to an L-shaped bracket 212. A first stop 214 is also attached to the bracket 212 and fits over an end of the drive shaft 196 and is operative to limit the translational movement of the follower 194 in the reverse direction. The opposite end of the drive shaft 196 is attached to a telescoping link 216 by a bearing 218 that allows the drive shaft 196 to rotate without causing rotation of the telescoping link 216. A second stop 220 is interposed between the bearing 218 and follower 194 prevents translation of the follower 194 in the forward direction.

Screw drive 186 is caused to rotate by a drive motor 222 and pulley arrangement 224. The pulley arrangement 224 includes first and second pulleys 226, 228, i.e., drive pulley 226 and driven pulley 228, that are interconnected by a belt 230. The drive motor 222 is a bidirectional motor and thus can rotate in a clockwise and a counterclockwise direction. When running in the clockwise direction, the pulley arrangement 224 causes drive shaft 232 to rotate in a first direction and when running in a counterclockwise direction, the pulley arrangement 224 rotates the drive shaft 232 in the opposite (second) direction. Infeed carriage 94 is mounted to a follower 234 that is threadingly engaged with the drive shaft 232 and thus translates along the length of the drive shaft 232 in response to rotation of the drive shaft 232. The follower 234 is also mounted to carrier 198. As such, carrier 198 also moves laterally with lateral movement of infeed carriage 94. This lateral movement also causes infeed carriage 90 to move laterally by virtue of its connection to outer arm 192.

Motor 222 and pulley arrangement 224 are operative to move the infeed carriages 94 and 90 laterally as needed to position conveying surfaces 84, 82 based on the operational mode of the helical conveyor apparatus 22.

Figure 5:
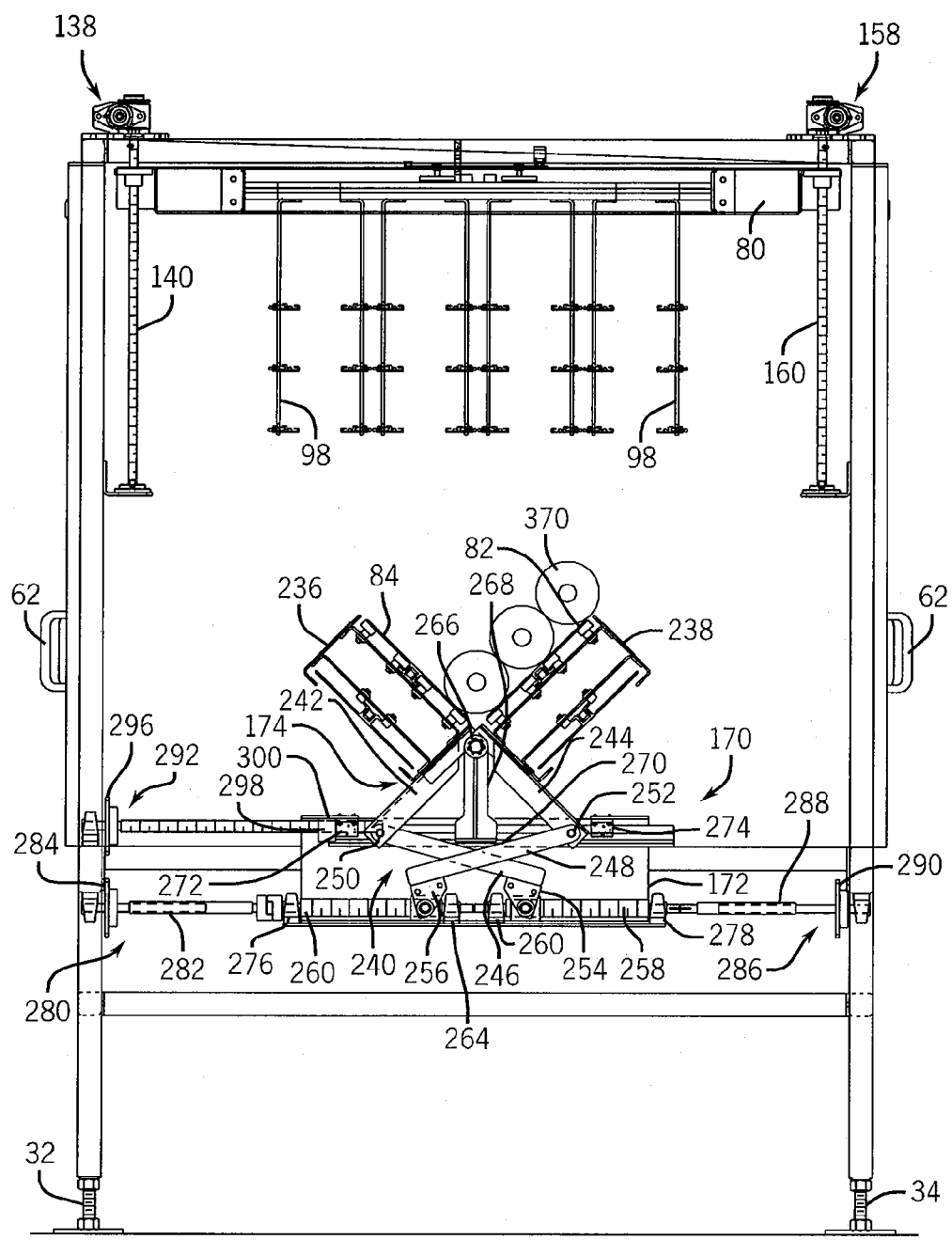
FIG. 5 is a section view of the helical conveyor apparatus taken along line 5-5 of FIG. 2.

As described above, FIG. 4 shows the infeed end 24 of the helical conveyor apparatus 22 when the helical conveyor apparatus 22 is in the upending position. FIG. 5 shows the middle of the helical conveyor apparatus 22 when in the upending position. As referenced above, a mid-length support structure 170 supports the conveying surfaces 82, 84 generally between the infeed and discharge ends of the helical conveyor apparatus 22. In this regard, the mid-length support structure 170 includes a left-side carriage 236 and a right-side carriage 238 that support the conveying surfaces 84 and 82, respectively. The carriages 236, 238 are supported by a scissors linkage 240, which is supported by carriage 172.

Figure 10:
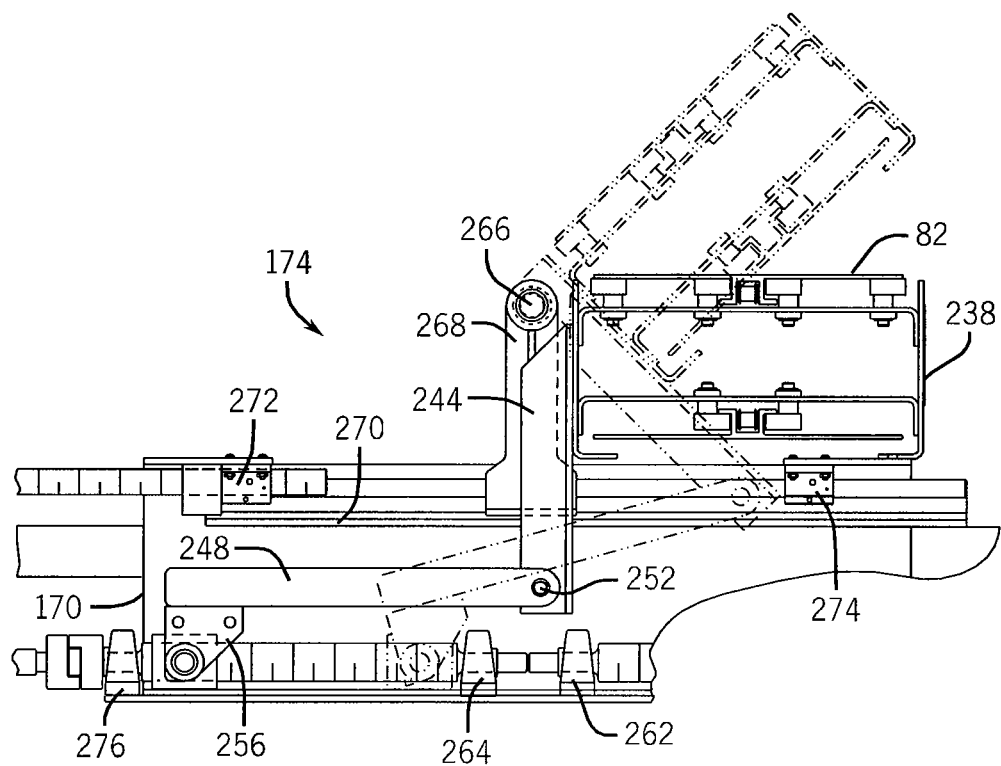
FIG. 10 is a front elevation view of a tipping assembly for a center portion of the helical conveyor apparatus according to another aspect of the invention.

With additional reference to FIG. 10, the scissors linkage 240 includes a pair of upper arms 242, 244 pivotally coupled to a pair of lower arms 246, 248. Upper arm 242 is pivotally attached to lower arm 246 at a pivot pin 250 and upper arm 244 is pivotally attached to lower arm 248 at pivot pin 252.

The lower arms 246, 248 are attached to followers 254, 256, respectively. The followers 254, 256 are threadingly engaged with screws 258, 260. Stops 262, 264 limit translation of the followers 254, 256 toward one another.

A central pivot pin 266 connects the upper arms 242, 244 to an upright post 268 that is attached to an upper end 270 of the carriage 172. The central pivot pin 266 effectively serves as a pivot point for rotation of the carriages 236, 238. Lateral movement of the upper arms 242, 244 away from each other (at pivot pins 250 and 252) is limited by stops 272, 274 which are fixed at opposed ends of the upper end 270 of the carriage 172. It will be appreciated that the scissors linkage 240 is constructed such that as followers 254, 256 move toward one another, i.e., toward the longitudinal centerline of the helical conveyor apparatus 22, the pivot pins 250, 252 move away from each other which causes the lower ends of the upper arms 242, 244 to also move away from each other. On the other hand, when the followers 254, 256 move away from each other, the upper arms 242, 244 are brought toward one another by pivoting about central pivot pin 266. When the followers 254, 256 have reached their maximum spacing (as defined by stops 276, 278), the upper arms 242, 244 will be adjacent and parallel to the upright post 268. Thus, when the followers 254, 256 are against stops 262, 264, the lower ends of upper arms 242, 244 are adjacent stops 272, 274. In this position, which is shown in FIG. 5, the scissors linkage 240 positions the left-side carriage 236 and the right-side carriage 238 at forty-five degrees relative to the upright post 268. On the other hand, as shown in FIG. 10, when the followers 254, 256 are at their widest position, the upper arms 242, 244 are pulled against the upright post 268 which causes the carriages 236, 238 to be rotated downward to a lay flat position.

Screw 260 is rotated by a slave drive 280 which includes a telescoping drive shaft 282 that is connected to a sprocket 284. Similarly, screw 258 is rotated by a slave drive 286 that includes a telescoping drive shaft 288 connected to a sprocket 290.

When the sprockets 284, 286 are rotated, the respective shafts are also rotated. Since the followers 254, 256 are threadingly engaged with the helical shafts 258, 260, the followers creep along the shafts as the shafts are rotated. When the shafts are rotated in a first direction, the followers 254, 256 will translate or creep toward one another, which results in the upper arms 242, 244 raising the carriages 236, 238 to the position shown in FIG. 5. When the shafts 258, 260 are rotated in a second, opposite direction, the followers 254, 256 will translate away from another thereby causing the upper arms 242, 244 to draw inwardly and lower the carriages 236, 238 as shown in FIG. 10. Thus, by rotating sprockets 284, 290, the conveying surfaces 82, 84 in the middle of helical conveyor apparatus 22 can be moved between the twisting configuration and the pass-through configuration.

Slave drive 292 is operable to adjust the center position of mid-length support structure 170. More particularly, slave drive 292 includes a helical drive shaft 294 connected to a sprocket 296 at one end and journaled to a follower 298 at the opposite end. The follower 298 is affixed to the carriage 172 by mounting plate 300. The follower 298 is threadingly engaged with the helical shaft 294, which allows the follower 298 to creep along the shaft 294 as the shaft 294 rotates. As the follower 298 creeps or translates along the shaft 294, the carriage 172 is drawn away or moved toward the longitudinal center of the helical conveyor apparatus 22. Telescoping drive shafts 282, 288 allow the carriage 172 to move sideward without damaging drive shafts 258, 260.

Figure 14:
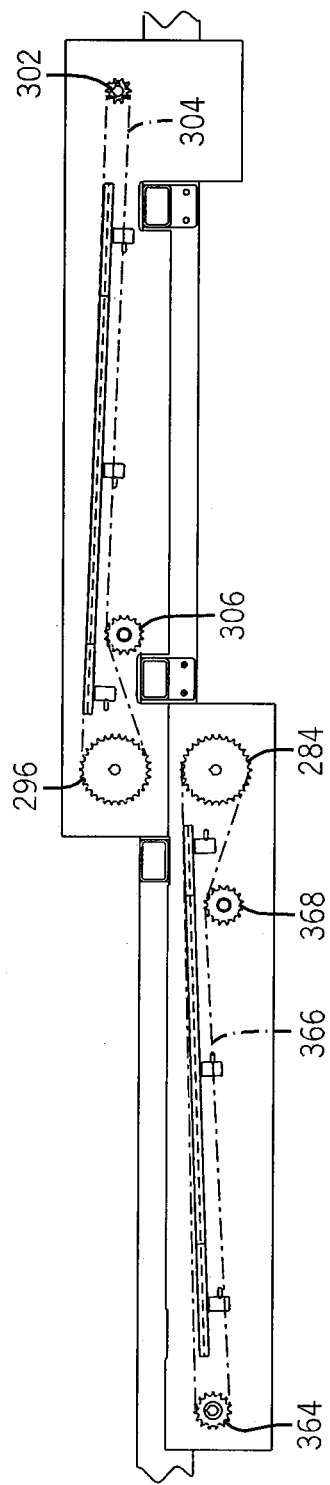
FIG. 14 is an elevation view of a centering drive assembly of the helical conveyor apparatus according to one embodiment of the invention.

Referring briefly to FIG. 14, sprocket 296 is driven by rotation of a sprocket 302 that is connected to drive shaft 232. A chain 304 is entrained around the sprockets 296 and 302 and an idler roller 306. Thus, when drive shaft 232 is rotated by motor 222, sprocket 302 will likewise rotate thereby causing translation of chain 304. Translation of the chain 304 is transferred to the sprocket 296 which causes sprocket 296 to rotate. Rotation of sprocket 296 causes shaft 294 to rotate as described above. Thus, the motor 222 operable to move infeed carriage 94 laterally is also operable to recenter the carriage 172 at the center of the helical conveyor apparatus 22.

It is contemplated that a helical conveyor apparatus could be constructed absent the aforedescribed twisting assembly for the middle of the conveyor surfaces, such as for shorter conveying surfaces. Similarly, it is contemplated that more than one "center" twisting assembly could be disposed between the infeed and discharge ends to provide multiple points of support therebetween for the conveying surfaces.

Turning now to FIG. 6, the discharge end 26 of the helical conveyor apparatus 22 is shown. The discharge end 26 is similar in construction to the infeed end 24. More particularly, the discharge end 26 includes a tipping assembly 182 that raises and lowers conveying surface 84 between the raised position shown in FIG. 6 and a lay-flat position, as shown in FIG. 9, for example. The tipping assembly 182 is comprised of a linkage 308 interconnected between discharge carriage 96 and a screw drive 310. The linkage 308, more particularly, includes an outer arm 312, a center arm 314, and an inner arm 316. The outer arm 312 is pivotally coupled to the center arm 314 at pivot pin 318. The inner arm 316 is pivotally coupled to the center arm 314 at pivot pin 320. The outer arm is mounted to a movable carrier 322. The movable carrier 322 is connected to a lateral screw drive 324 via a follower 326. The follower 326 is also attached to discharge carriage 92, which enables the discharge carriage 92 and the outer arm 312 to move laterally during operation of the screw drive 324. Discharge carriage 96 is mounted to the outer arm 312 by a gusset 328 that is pivotal about pivot pin 318.

The screw drive 324 is comprised of a helical shaft 330 driven by a drive motor 332 through a pulley arrangement 334, which consists of a drive pulley 336 and a driven pulley 338. The output shaft (not shown) of the drive motor 332 rotates drive pulley 336, which in turn causes translation of a belt 340 entrained around the drive pulley 336 and the driven pulley 338. Accordingly, as the belt 340 translates, the helical shaft 330 similarly rotates about its rotational axis. Follower 326 is threadingly engaged with the helical shaft 330 and thus creeps along the length of the helical shaft 330 as the shaft rotates. The drive motor 332 is a bidirectional motor and thus can ultimately cause the helical shaft 330 to rotate in a clockwise direction or a counterclockwise direction to move carrier 322 toward or away from the longitudinal center of the helical conveyor apparatus 22.

A sprocket 342 is attached to an outer end of shaft 330 and thus rotates with rotation of the shaft 330. Sprocket 342 is chained to sprocket 290 and thus causes sprocket 290 to rotate, which as described above, effectuates raising and lowering of the right-side carriage 238.

As noted above, the linkage 308 includes an inner arm 316 pivotally connected to center arm 314 at one end and pivotally connected to a follower 344 at its opposite end. The follower 344 is configured to creep along a helical drive shaft 346 as the shaft 346 rotates. The shaft 346 is rotated by a drive motor 348 and pulley arrangement 350 consisting of a drive pulley 352 and a driven pulley 354 interconnected by a belt 356. Lateral movement of the follower 344 is prevented by stops 358, 360 positioned at respective ends of the helical shaft 346.

The non-motor end of the shaft 346 is coupled to a telescoping rod 362 that is in turn connected to a sprocket 364. As the telescoping rod 362 rotates, it drives rotation of sprocket 364, which is connected to sprocket 284 (FIG. 14) by chain 366. As also shown in FIG. 14, the chain 366 can also be entrained around an idler roller 368 to maintain tension on the chain 366. In this regard, motor 348, which drives folding and unfolding of the discharge carriage 96, also drives rotation of shaft 260 for raising and lowering left-side carriage 236.

With additional reference to FIGS. 7 and 8, similar to that described above with respect to the infeed end 24, when the shaft 346 is rotated in a first direction, follower 344 will creep toward the longitudinal center of the helical conveyor apparatus 22, i.e., toward the motor side of the shaft 346. Movement of the follower 344 in this direction will effectively pull the inner arm 316 inward and thus cause the center arm 314 to rotate about pivot pin 320. When the follower 344 reaches stop 360, the center arm 314 will have fully rotated to an upright position generally adjacent and parallel to the outer arm 312, which as shown in FIG. 8, places the discharge carriage 96 in a lay-flat position on plane with discharge carriage 92.

As described above, the helical conveyor apparatus 22 is operable in either an upending mode or a pass-through mode. FIGS. 4-6 show the helical conveyor apparatus 22 in the upending mode. FIGS. 7 and 8 show the movement of the discharge carriages 92, 96 from the upending configuration to the pass-through configuration. FIG. 9 shows the center of the helical conveyor apparatus 22 in the lay-flat (pass-through) configuration. While not explicitly shown in the figures, the infeed carriages 90, 94 move in a mirrored fashion. Similarly, the left-side carriage 236 and the right-side carriage 238 are rotated downward to a lay-flat position (FIG. 9). These movements are controlled by a series of screw drives, pulley arrangements, and sprockets to provide a coordinated and well-timed movement of the helical conveyor apparatus 22 so that conveying surface do not bind as the helical conveyor apparatus 22 is moved from the upending mode to the pass-through mode, or vice-versa. In the upending mode, the helical conveyor apparatus 22 effectively twists an object or array of objects 370 as those objects pass from the infeed end 24 to the discharge end 26. When the conveying surfaces 82, 84 are "untwisted" they are preferably realigned; otherwise, the discharge end 26 would be offset from the infeed end 24. Accordingly, as described above, the helical conveyor apparatus includes recentering mechanisms that move the various carriages at the infeed end, apparatus center, and discharge end laterally. In a preferred embodiment, this recentering is carried out simultaneously with raising and lowering of the respective conveying surfaces. When changing from the upending mode to the pass-through mode, the infeed carriages 90, 94 and the discharge carriage 92, 96 are moved an equal distance, e.g., eight inches, but in opposite directions so that the small gap between the conveying surfaces runs along the longitudinal center of the helical conveyor apparatus 22.

The mid-length support structure 170 is moved one-half the distance the respective end carriages are moved, and toward the longitudinal center of the helical conveyor apparatus 22. Thus, for example, if the end carriages are each moved eight inches to a recentered position, the center of the helical conveyor apparatus 22 is moved four inches. Doing so maintains the alignment of the conveying surfaces on each side of the longitudinal center of the helical conveyor apparatus 22.

Figure 12:
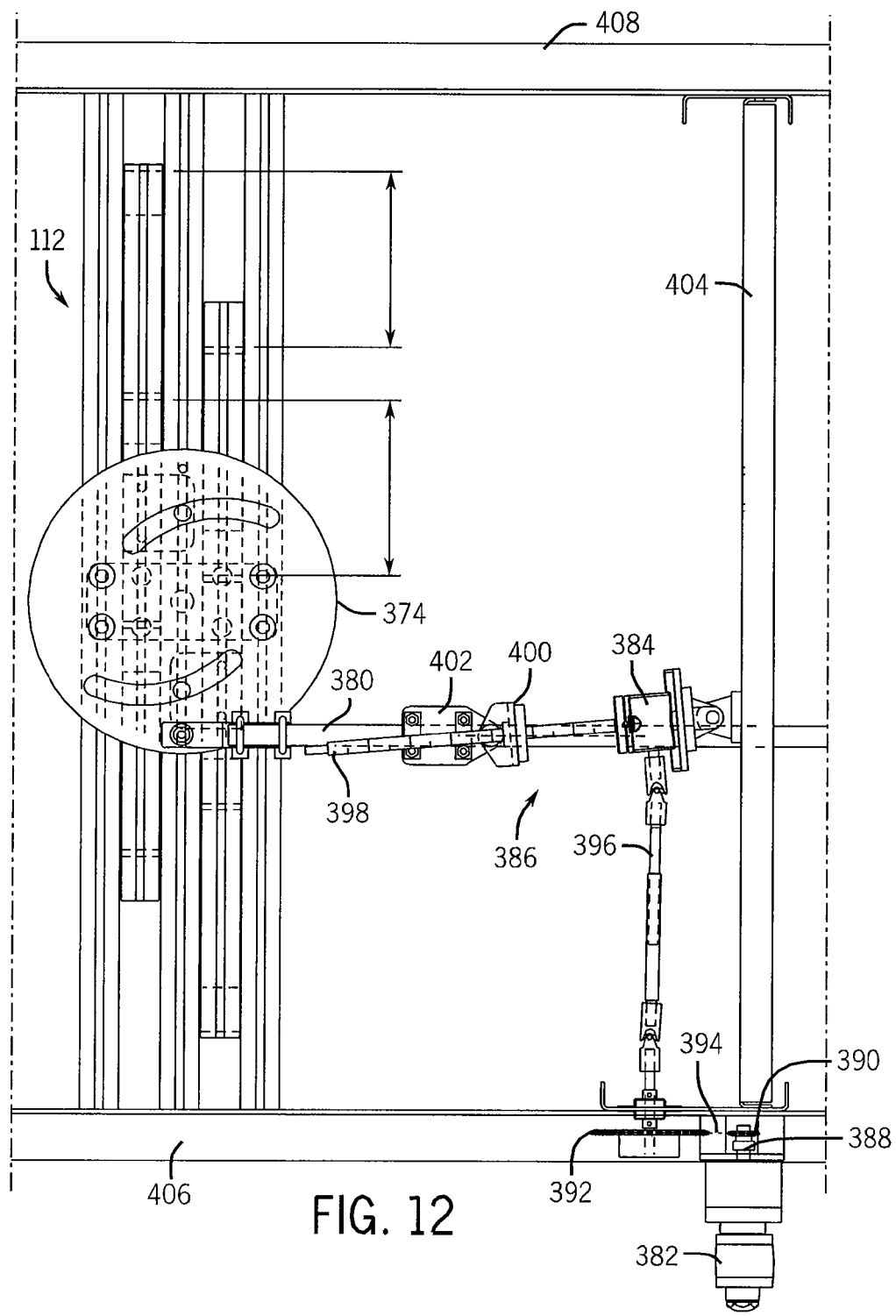
FIG. 12 is an enlarged view of a portion of the guide rail assembly.
Figure 13:
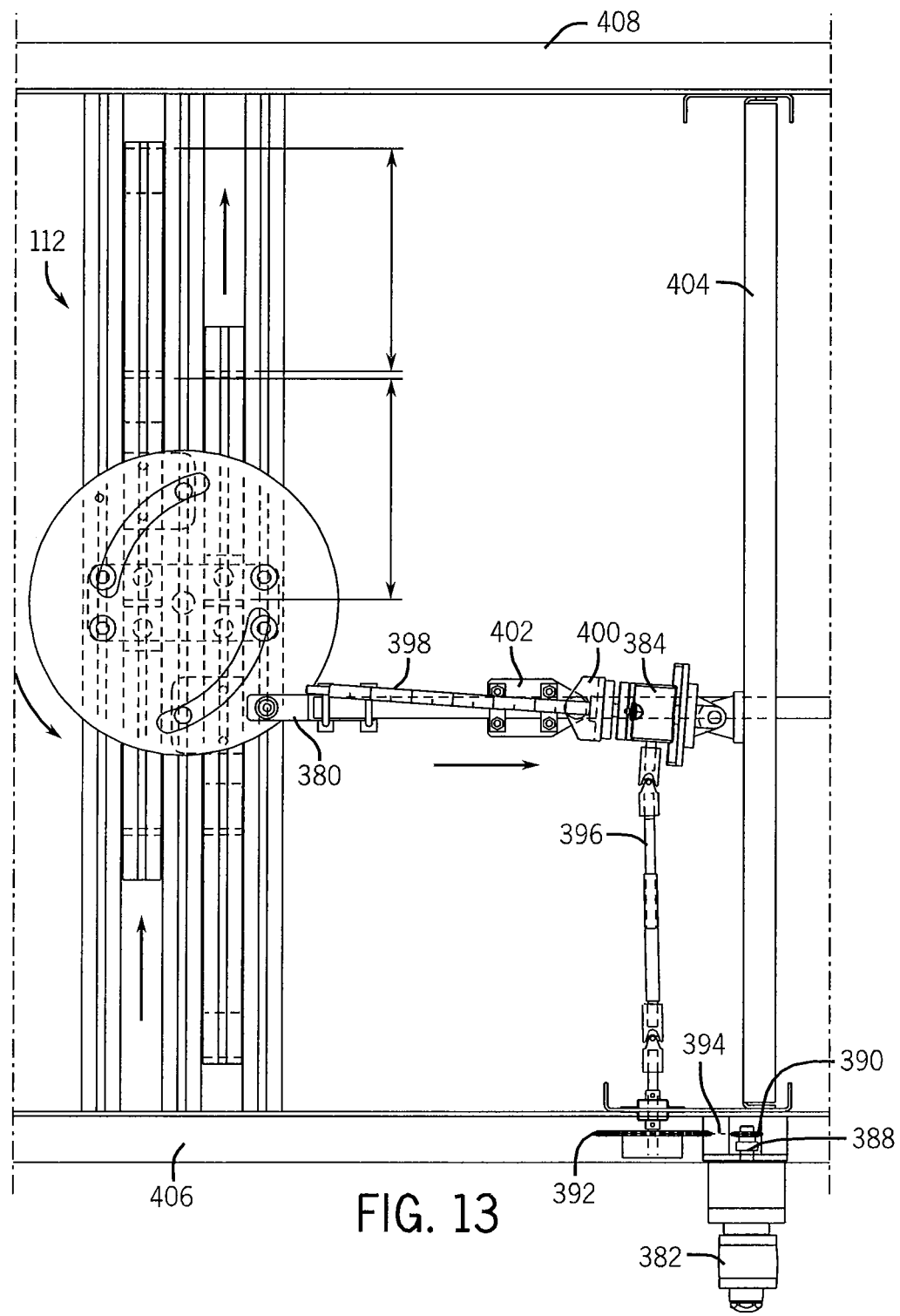
FIG. 13 is an enlarged view of the guide rail assembly similar to FIG. 12 showing a change in position of the guide rail assembly resulting from operation thereof according to one aspect of the invention.

Referring now to FIGS. 11-13, a guide rail drive assembly 372 according to alternate embodiment of the invention is shown. The drive assembly 372 includes three cam plates 374, 376, 378, each of which is attached to an elongated rod 380. A drive motor 382 is mechanically coupled to a gearbox 384 which forms part of a linear screw drive 386. More particularly, the drive motor 382 has an output shaft 388 that carries a drive sprocket 390 that is chained to a driven sprocket 392 by chain 394. The gearbox 384 has an input shaft 396 that is mechanically coupled to the driven sprocket 392. The gearbox 384 transfers the rotation of the input shaft 396 to a helical shaft 398. A follower 400 is threadingly engaged with the helical shaft 398 such that rotation of the helical shaft 398 causes the follower 400 to creep along the helical shaft 398. The drive motor 382 is a bidirectional motor and thus is capable of causing the helical shaft 398 to rotate in either a clockwise or a counterclockwise direction. The follower 400 is connected to a coupler 402 that is mounted to elongated rod 380. In this regard, when the follower 400 moves toward the gearbox 384, the coupler 402 pulls the elongated rod 380 away from slave cam plate 374, which in turn pulls on the cam plate 374 so that it rotates in the counterclockwise direction (as shown by comparing FIGS. 12 and 13). Rotation of the helical shaft 398 in the opposite direction causes linear movement of the elongated rod 380 in the opposite direction, which causes the cam plate 374 to rotate in the clockwise direction. This movement of the cam plate 374 causes headers 112 to slide, which effectively changes the spacing between the rails 98 mounted to headers 112.

Since the elongated rod 380 is also attached to cam plates 376, 378, the rotation of cam plate 374 is repeated by cam plates 376, 378 to cause the headers mounted thereto to slide and ultimately change the spacing between the rails mounted to the headers. Thus, it will be appreciated that all three cam plates 374, 376, and 378 are driven directly by linear movement of the elongated rod 380 rather than following the movement of a master cam plate such as that shown in FIGS. 1A and 1B. As best shown in FIG. 12, the gearbox 384 is mounted to a transverse beam 404 that extends between frame members 406, 408 that are connected at each end to guide boom 78 and guide boom 80.

Figure 15:
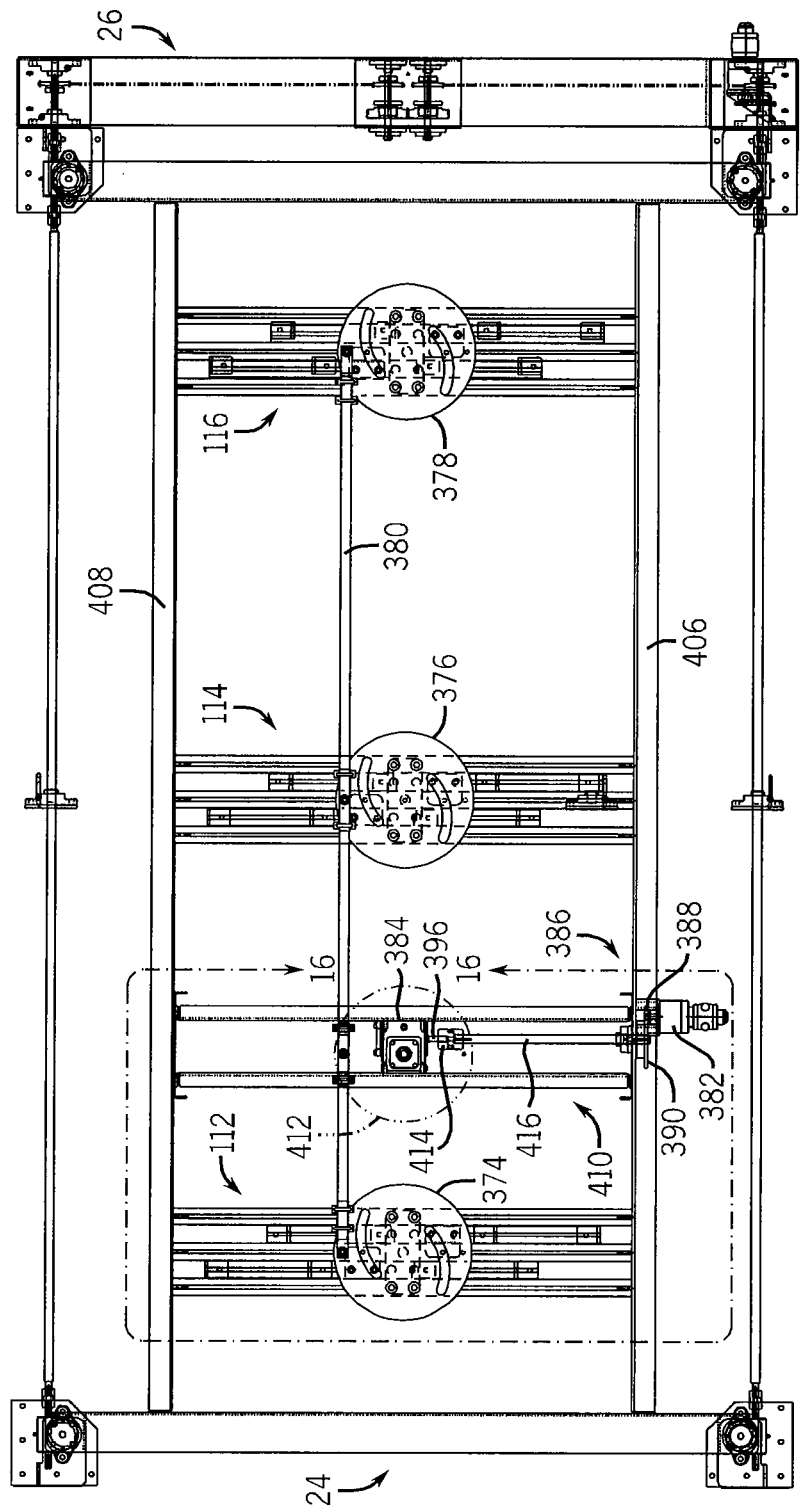
FIG. 15 is a top plan view of the guide rail assembly of the helical conveyor apparatus according to another aspect of the invention.
Figure 16:
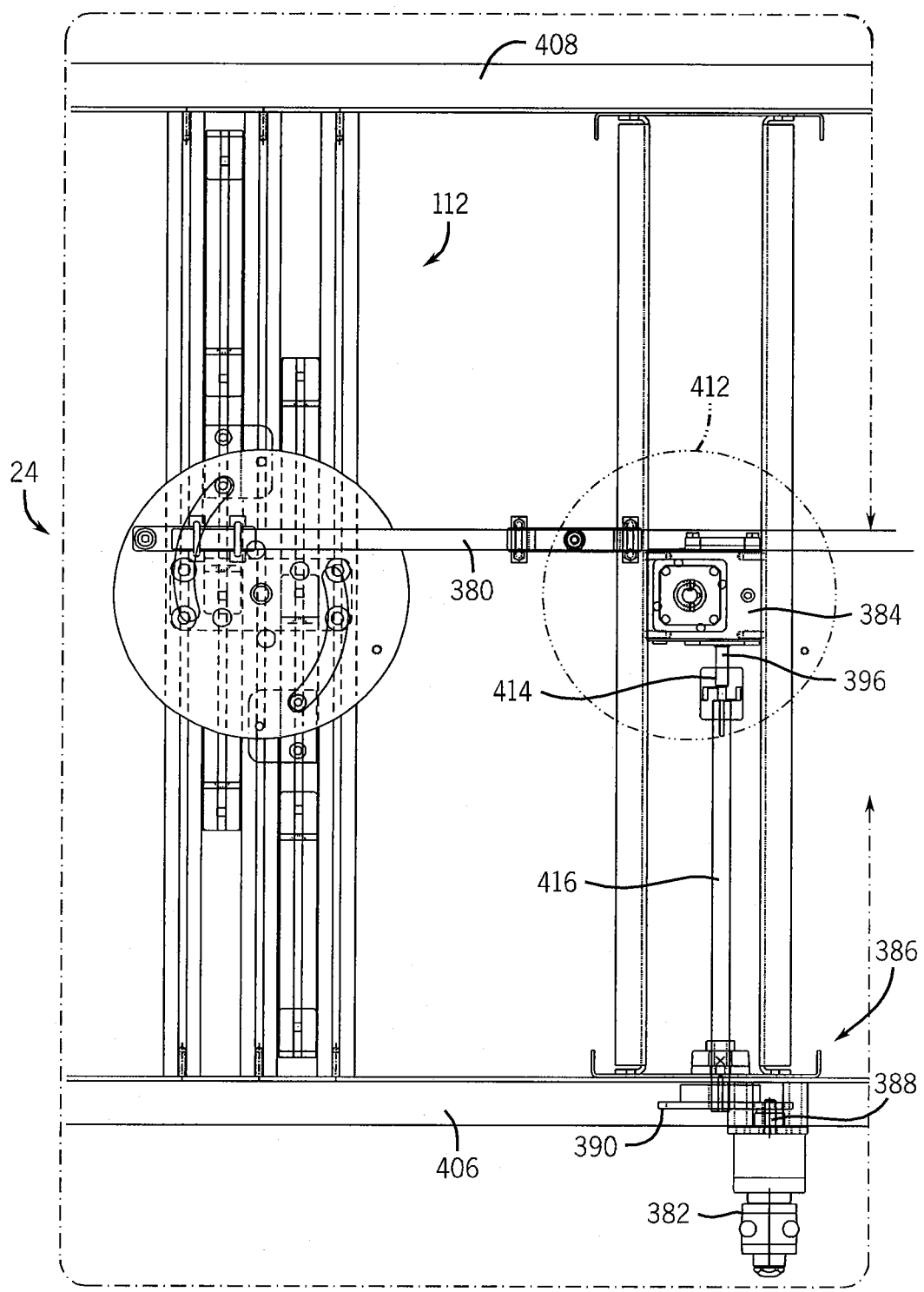
FIG. 16 is an enlarged view of a portion of the guide rail assembly.

Turning now to FIGS. 15 and 16, a guide rail drive assembly 410 according to another embodiment of the invention is shown. The guide rail drive assembly 410 interfaces with cam plates 374, 376, and 378, which are interconnected by elongated rod 380. Drive motor 382 is mechanically coupled to gearbox 384 which is supported by a disc 412, this also mechanically coupled to the elongated rod 380. The output shaft 388 of the drive motor 382 carries drive sprocket 390, which is mechanically coupled to the gearbox 384 by input shaft 396. More particularly, input shaft 396 is coupled to a universal joint 414 that is connected to shaft 416.

The gearbox 384 transfer the rotation of the input shaft 396 to the disc 412, which causes the elongated rod 380 to be moved forward or rearward and laterally, as best shown in FIG. 16. Comparing FIGS. 15 and 16 it can be seen that the elongated rod 380 was moved toward the it is conveyed from infeed end 24 and was also moved toward the rightside of the material handling system 20 (lowered in the figure). As the elongated rod 380 is coupled to the cam plates 374, 376, and 378, this movement of the elongated rod 380 is followed by the cam plates, i.e., the cam plates are caused to rotate, as shown in FIG. 16. As described above, movement of the cam plates causes headers 112 to slide which effectively changes the spacing between the rails 98 mounted to the headers 112.

While the invention has been described with motorized systems to raise/lower and recenter the helical conveyor apparatus 22, it is understood that hand cranks could also be used. Additionally, it is understood that the material handling system 20 could be equipped with sensors that can detect the positions of the helical conveyor apparatus 22 and alarm a user that the helical conveyor apparatus is not properly positioned for an intended operation. Moreover, it is understood that various optical eyes or similar devices could be used to count the objects as they are conveyed by the helical conveyor apparatus 22 as known in the art. Furthermore, the material handling system 20 may have a control system and operator interface, such as a user panel, to enable a user to instruct a change between the upending and pass-through modes. Also, while the material handling system 20 is shown as passing an array of three paper rolls in the upending mode and six paper rolls in the pass-through mode, it is understood that the invention is not so limited.

Additionally, while the helical conveyor apparatus 22 has been described as having various pulleys, sprockets, belts, and chains, it is understood that the helical conveyor apparatus 22 could be fitted with other types of motion transfer devices. Moreover, it is understood that the pulleys described herein could be replaced with a sprocket or similar gear device, and vice-versa. Similarly, the belts described herein could be replaced with chains, and vice-versa.

Many changes and modifications could be made to the invention without departing from the spirit thereof. The scope of these changes will become apparent from the appended claims.

The invention claimed is:

1. A conveying apparatus comprising:
a first conveying surface;
a second conveying surface adjacent the first conveying surface, at least one of the first and second conveying surfaces being twistable along a longitudinal axis of the respective at least one of the first and second conveying surfaces; and
wherein the second conveying surface is pivotable between a raised position in which the second conveying surface is operative to cooperate with the first conveying surface to rotate an object from a first position to a second rotated position as the object travels along the first conveying surface and a lowered position in which the second conveying surface is substantially coplanar with the first conveying surface for passing of a object without rotation.

2. The conveying apparatus of claim 1 wherein the raised position is orthogonal to the lowered position.

3. The conveying apparatus of claim 1 further comprising an infeed end and a discharge end spaced from the infeed end, and wherein the first conveying surface and the second conveying surface extend between the infeed end and the discharge end, and wherein the first conveying surface at the discharge end is offset from the first conveying surface at the infeed end and the second conveying surface at the infeed end is offset from the second conveying surface at the discharge end.

4. The conveying apparatus of claim 3 further comprising a centering assembly that automatically eliminates the offset between the first and the second ends of the first conveying surface and the second conveying surface when the second conveying surface is moved from the raised position to the lowered position.

5. The conveying apparatus of claim 4 wherein the first conveying surface and the second conveying surface are of equal width.

6. The conveying apparatus of claim 1 further comprising a first motor for translating the first conveying surface and a second motor for translating the second conveying surface.

7. The conveying apparatus of claim 6 wherein the first motor translates the first conveying surface at a first translation speed and the second motor translates the second conveying surface at a second translation speed.

8. The conveying apparatus of claim 7 wherein the first and second translation speeds are substantially equal.

9. The conveying apparatus of claim 6 wherein the first and second translation speeds are unequal.

10. A conveying apparatus having first and second conveying surfaces for positively translating a package from an infeed end to a discharge end, comprising:
a first operating arrangement in which the first and the second conveying surfaces are each twisted along a respective longitudinal axis and cooperate with one another to twist a package as it translates along both the first and second surfaces; and
a second operating arrangement in which the first and second conveying surfaces are not twisted and cooperate to pass a package without twisting of the package.

11. The conveying apparatus of claim 10 wherein the package is one of a roll of paper and a carton.

12. The conveying apparatus of claim 10 further comprising a motorized assembly for switching the first and second conveying surfaces between the first operating arrangement and the second operating arrangement.

13. The conveying apparatus of claim 12 wherein the first and second conveying surfaces are orthogonal to one another at the infeed and discharge ends when in the first operating arrangement and are coplanar to one another at the infeed and discharge ends when in the second operating arrangement.

14. The conveying apparatus of claim 10 wherein the first and second conveying surfaces up-end the package when in the first operating arrangement.

15. The conveying apparatus of claim 10 wherein the first and the second conveying surfaces down-end the package when in the first operating arrangement.

16. The conveying apparatus of claim 10 wherein the second arrangement enables pass through of the package without up-ending or down-ending between the infeed end and the discharge end.

17. The conveying apparatus of claim 10 wherein the first and the second conveying surfaces are modular chain.

18. A conveying apparatus comprising:
an infeed end and a discharge end; and
a pair of elongated conveying surfaces extending between the infeed end and the discharge end, the conveying surfaces operable in a first orientation in which the conveying surfaces provide positive contact with two orthogonal sides of an object as the object is conveyed from the infeed end to the discharge end and operable in a second orientation in which the conveying surfaces provide positive contact with only one side of the object as the object is conveyed from the infeed end to the discharge end.

19. The conveying apparatus of claim 18 wherein the object includes an array of paper rolls.

20. The conveying apparatus of claim 18 further comprising a centering assembly that laterally shifts the pair of elongated conveying surfaces as the elongated conveying surfaces are moved between the first orientation and the second orientation.

21. A conveying apparatus comprising:
a first conveying surface;
a second conveying surface adjacent the first conveying surface;
wherein the second conveying surface is pivotable between a raised position in which the second conveying surface is operative to cooperate with the first conveying surface to rotate an object from a first position to a second rotated position as the object travels along the first conveying surface and a lowered position in which the second conveying surface is substantially coplanar with the first conveying surface for passing of an object without rotation;
an infeed end and a discharge end spaced from the infeed end; and
wherein the first conveying surface and the second conveying surface extend between the infeed end and the discharge end, and wherein the first conveying surface at the discharge end is offset from the first conveying surface at the infeed end and the second conveying surface at the infeed end is offset from the second conveying surface at the discharge end.

22. A conveying apparatus having first and second conveying surfaces for positively translating a package from an infeed end to a discharge end, comprising:
a first operating arrangement in which the first and the second conveying surfaces cooperate to twist a package as it translates along the first and second surfaces;
a second operating arrangement in which the first and second conveying surfaces cooperate to pass a package without twisting of the package;
a motorized assembly for switching the first and second conveying surfaces between the first operating arrangement and the second operating arrangement; and
wherein the first and second conveying surfaces are orthogonal to one another at the infeed and discharge ends when in the first operating arrangement and are coplanar to one another at the infeed and discharge ends when in the second operating arrangement.

* * * * *